Patented Apr. 6, 1926.

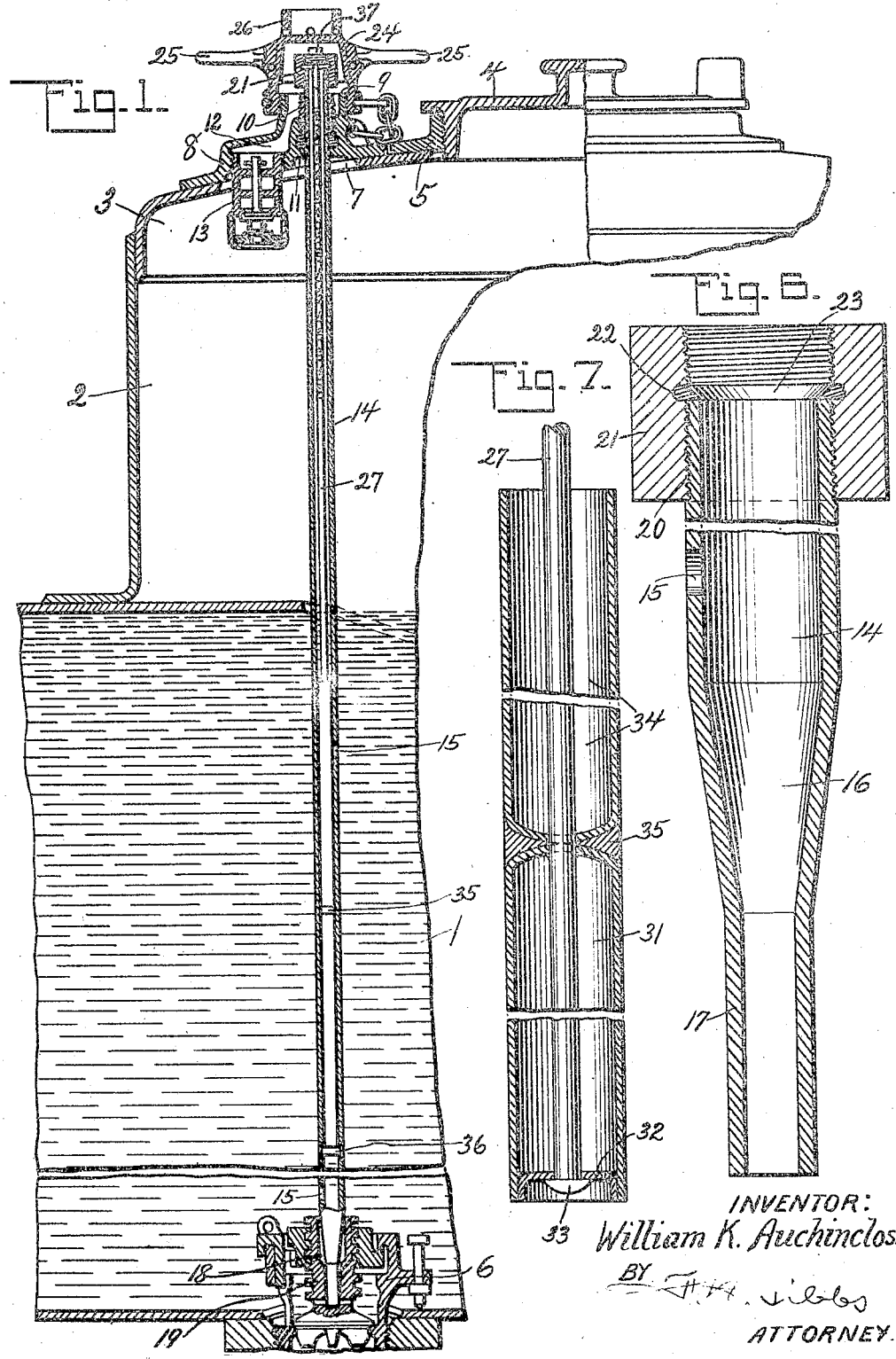

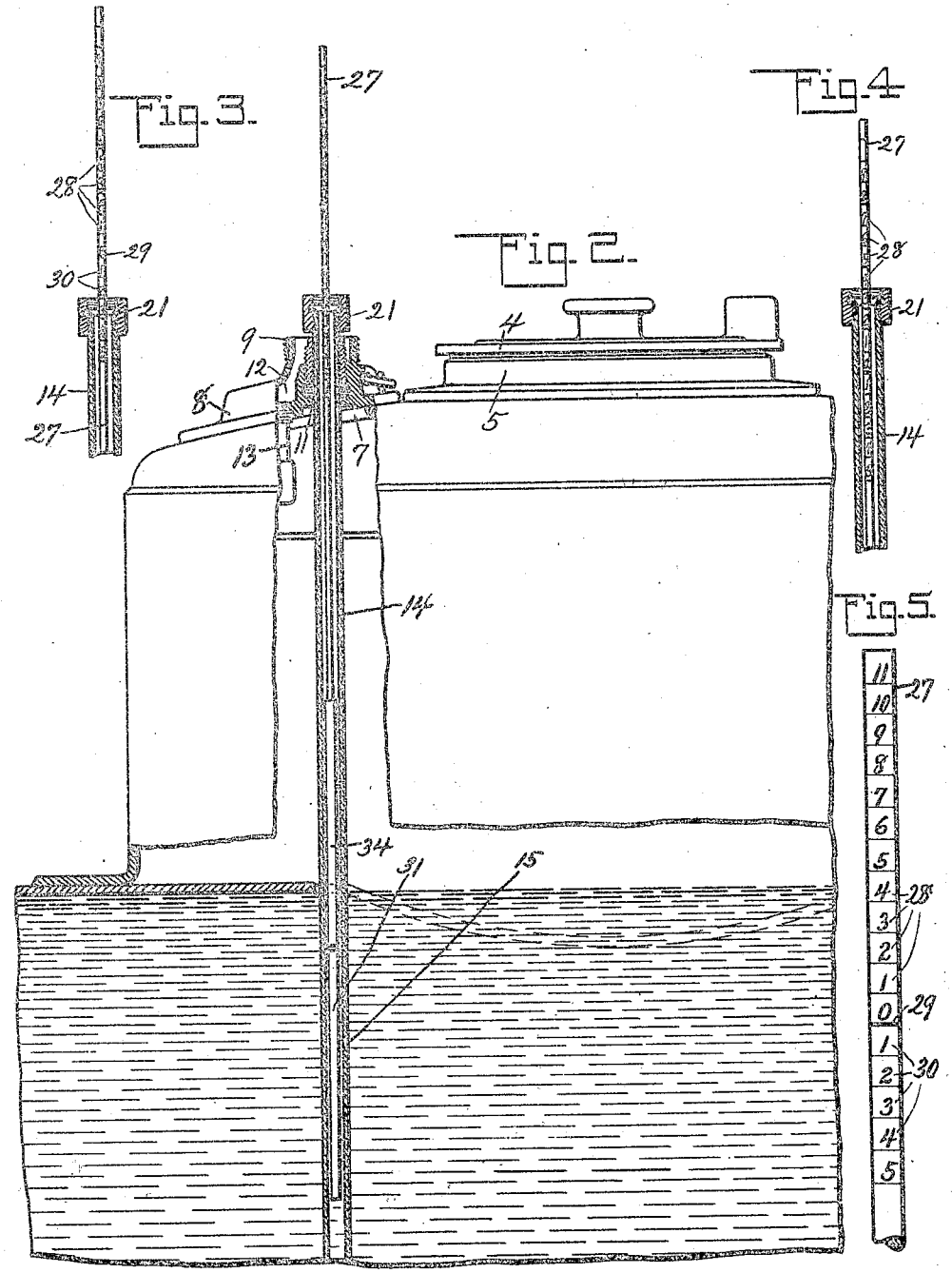

BEST AVAILABLE COPY 1,579,203

UNITED STATES PATENT OFFICE.

WILLIAM K. AUCHINCLOSS, OF NEW YORK, N. Y., ASSIGNOR TO AMERICAN CAR AND FOUNDRY COMPANY, OF NEW YORK, N. Y., A CORPORATION OF NEW JERSEY.

TANK-CAR VALVE AND GAUGE MECHANISM.

Application filed December 6, 1924. Serial No. 754,356.

*To all whom it may concern:*

Be it known that I, WILLIAM K. AUCHINCLOSS, residing at New York, N. Y., and being a citizen of the United States, have invented certain new and useful Improvements in a Tank-Car Valve and Gauge Mechanism, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described; as it is obvious that various modifications thereof within the scope of the claims will occur to persons skilled in the art.

In said drawings:

Figure 1 is a fragmentary vertical sectional view through a tank car showing the improved gauge and valve operating means with the gauge disposed in a collapsed position within the valve operating stem or key;

Figure 2 is a view similar to Figure 1 showing the gauge rod projected into position for reading;

Figure 3 is an enlarged fragmentary sectional view showing the position of the gauge rod when the dome portion of the tank car is partially filled with fluid;

Figure 4 is a view similar to Figure 3 showing the position of the gauge rod when the tank is partially emptied;

Figure 5 is an enlarged view of the upper end portion of the gauge rod and showing the scale markings provided thereon;

Figure 6 is an enlarged longitudinal sectional view through the valve operating stem or key, and Figure 7 is an enlarged view showing the lower end portion of the gauge rod in elevation and the float and sample removing cup in section.

An object of the invention is to provide a combined valve operating device and gauge mechanism, which can be mounted in connection with a tank car of a conventional construction and be used as means for adjusting the outlet valve in the bottom of the tank, and also as means for determining the amount of liquid contained in the tank.

Another object of the invention is to so construct this device that it may also be used as means for withdrawing a sample of the contents of the tank and to further so construct and mount the device that the outlet valve may be adjusted, a sample removed or the gauge read to determine the amount of liquid in the tank without it being necessary to remove the dome cover.

Another object of the invention is to so mount this device that the cap or casting through which the upper end portion of the stem extends may be also provided with a valve controlled by-pass through which air may pass into the dome to prevent the formation of a vacuum when the valve is opened and liquid permitted to pass out of the tank.

This improved device is for use in connection with a tank car which will be of the conventional construction provided for shipping oil and other liquids. This car tank which is indicated in general by the numeral 1 is provided with the usual dome 2 having a head 3 and dome cover 4 which is screwed into the usual collar 5 so that this dome cover may be removed when filling or airing the tank. The tank 1 will also be provided with the usual self locking valve which is indicated in general by the numeral 6 and serves to control the passage of the liquid through the outlet in the bottom of the tank. It is desired to permit this valve to be opened and closed without it being necessary to remove the dome cover and therefore the improved device forming the subject-matter of this invention has been developed.

At one side of the collar 5 which carries the dome cover the head 3 of the dome has been provided with an opening 7 which is disposed above the valve 6 and will be covered by a cap 8. This cap 8 is formed as a casting and will be secured upon the dome head 3 in any desired manner so that it covers the opening 7. An upwardly extending neck 9 is provided upon this cap and this neck 9 will be disposed about a bushing sleeve 10 which is screwed into the upper end portion of a passage 11 formed in the cap. The cap is also provided with a by-pass 12 leading from the neck 9 and at its lower end this by-pass is provided with a check valve 13 which will extend through the opening 7 into the dome. This check valve 13 opens inwardly and it will therefore be seen that when liquid is permitted to pass out of the tank through the opening in the bottom of the tank, air will be permitted to be drawn inwardly through the check valve 13 and the formation of a vacuum in the car tank prevented.

The stem of key 14 for operating the valve 6 is formed as a tube which is of greater length than the combined depth of the car tank and dome. This tube is provided with side openings 15 in spaced relation to each other throughout the length of the tube so that liquid in the tank may pass into this hollow stem or key. The lower end portion 16 of the tube is tapered downwardly, as shown in Figs. 1 and 6, and terminates in an extension 17 which will be rectangular in cross section so that when the stem or key is put in place the tapered lower end portion 16 and rectangular extension 17 will fit into the socket 18 provided in the threaded stem 19 of the valve which controls the passage of liquid out of the tank and causes the valve to be opened or closed when the hollow stem or key 14 is rotated. The upper end portion of this hollow key extends through the bushing sleeve 10 and has a threaded upper end portion 20 which is disposed above the neck 9 and carries a turning head or block 21. This turning head 21 which will have flat wrench engaging side faces is screwed upon the threaded upper end portion of the key 14 to the position shown in Fig. 6. Intermediate its depth the head has been provided with an internal annular groove forming a seat 22 in which is provided a filler 23 which extends to provide abutment means for engaging the upper edge of the stem. This filler is in the form of metal which will be welded to the stem and thereby serve to very firmly hold the turning head upon the stem. The cover or hood 24 will be screwed upon the neck 9, as shown in Fig. 1, and when in place will serve to enclose the upper end portion of the stem and turning head and also serve to prevent dust and other foreign matter from accumulating in the neck and by-pass 12. This cover 24 is provided with handles 25 so that it may be easily turned when it is to be removed or put in place and is further provided with a socket extension 26 which is of the proper size to receive the turning head when the cover is removed from the neck and turned to an inverted position. It will thus been seen that this cover may be used as a wrench for turning the stem.

In order to determine the amount of liquid in the car tank there has been provided a gauge rod 27 which is formed of metal and has its upper end portion provided with scale markings. These scale markings are shown in Fig. 5 and referring to this figure it will be seen that the gauge rod is so marked that it provides an upper set of scale markings 28 above the dividing line 29 and a lower set of scale markings 30 below the dividing line 29. This gauge is to be of the float type and therefore there has been provided a float 31 which is formed as a metal cylinder. This float fits upon the lower end portion of the rod 27, as shown in Fig. 7, and at its lower end is provided with a head 32 secured in the body of the cylinder and having an opening receiving the extreme lower end of the rod. This extreme lower end of the rod is formed into a head 33 which will engage the under face of the head 32 and serve to support the cylindrical float upon the rod. Above the float there has also been provided a cup 34 which is disposed about the rod and has its lower end resting upon the upper end of the float 31. The upper end of the float and the lower end of the cup are curved in opposite directions in cross section thereby providing a space which will be filled with metal 35 so that the float and cup can be welded together. This weld provides a very good joint between the float and cup.

When this device is in use it will be installed as shown in Fig. 1 with the cap secure upon the dome head and the hollow key or stem extending downwardly through the dome and body of the car tank. The gauge is disposed within the tubular stem and will be limited in its downward movement by engagement with the rivet 36 which extends through this stem as shown in Fig. 1. When the gauge is disposed within this tubular stem its upper end will terminate adjacent the upper end of the stem so that the upper end of this rod will not prevent the plug 37 from being screwed into the upper end portion of the turning head. Therefore when the tank is filled this plug will serve to keep the gauge within the tubular stem and the cap or hood 24 can be removed without the gauge rod being projected upwardly from the stem.

When it is desired to remove a sample of the liquid from the car tank and measure the amount of liquid in the tank the plug 37 will be removed after the cover 24 has been removed and the gauge will be bodily withdrawn through the upper end of the hollow stem. A certain amount of the liquid will be withdrawn by the cup 34 and this can be poured out and examined. The gauge will then be replaced in the stem and the upper end portion carrying the scale markings will project through the upper end of the stem, as shown in Figs. 2, 3 and 4. If the liquid extends up into the dome of the car tank the scale markings 30 will be disclosed above the turning head as shown in Fig. 3, but if the liquid only partially fills the tank or completely fills it the lower scale markings 30 will be hidden from view within the tubular stem and the upper scale markings will be disclosed for reading, as shown in Figs. 2 and 4. It will therefore be seen that with this device it can be determined whether or not the liquid extends up into the dome or is all contained within the body of the car tank. When it is desired to withdraw a portion of the liquid from the car tank it is simply necessary to invert the cover 24 so that the socket 26 may be engaged with the turning head 21 and the stem can then be rotated to open the valve. The liquid will then pass out of the tank through the opening controlled by this valve. After a sufficient quantity of liquid has been passed out of the tank the stem will again be rotated to close the valve. The gauge may be watched during the time the liquid is passing out of the tank or if desired the gauge may be moved into the stem and the plug replaced while the liquid is passing out of the tank and after a sufficient quantity has been withdrawn the plug again removed so that the gauge will move upwardly and indicate the amount which has been withdrawn. There has been, therefore, provided a device which will serve very effectively as a valve operating device and as a gauge.

What is claimed is:

1. In combination a tank having an outlet in its bottom, a control valve for the outlet of said tank, an operating key for said valve extending upwardly from the valve through the tank for operation externally of the tank, a check valve in the opening in the top of the tank for controlling the passage of air into the tank, and a float gauge carried by said valve operating key and adapted to project externally of the tank.

2. In combination a tank having an outlet in its bottom, a control valve raised and lowered for opening and closing the outlet of said tank, an operating key for said valve extending upwardly from the valve through the tank for operation externally of the tank, and gauge means carried by said key for indicating the amount of material in the tank.

3. In a tank car a tank, a cap for closing an opening in the tank dome, a check valve mounted in a by-pass in said cap for controlling the passage of air into the tank, having an outlet in its bottom, a control valve for the outlet of said tank, a hollow operating key for said valve extending upwardly from the valve through said cap for operation externally of the tank, said key being perforated for permitting fluid in the tank to enter the key, and a float gauge slidable in the key and adapted to project through the upper end of the key for observation externally of the tank.

4. In combination a tank having an outlet in its bottom, a control valve for the outlet of said tank, a hollow operating key for said valve extending upwardly from the valve through the tank for operation externally of the tank, said key being perforated for permitting fluid in the tank to enter the key, and gauge means readable externally of the tank and having a float slidable in said hollow key, said key being constructed to permit removal of the float from the top thereof.

5. In a tank car a tank having an outlet in its bottom, a control valve raised and lowered for opening and closing the outlet of said tank, an operating key for said valve extending through the tank dome and gauge means carried by said stem and readable externally of the tank dome for indicating the amount of material in the tank.

6. In combination a tank having an outlet in its bottom, a control valve for the outlet, a hollow perforated operating key for said valve extending upwardly from the valve and externally of said tank, a gauge rod sliding in said key and projectable through the upper end thereof for reading, a float carried by the lower end portion of said rod, and removable closure means for the upper end of said hollow key.

7. In combination a tank having an outlet in its bottom, a control valve for the outlet, a hollow perforated operating key for said valve extending upwardly from the valve and externally of said tank, a gauge rod sliding in said key and projectable through the upper end thereof for reading, a float carried by the lower end portion of said rod, and a cup carried by said rod for removing a portion of the contents of the tank when the rod, float and cup are removed from the hollow key through the upper end thereof.

8. In combination a tank having an outlet in its bottom, a control valve for the outlet, a hollow perforated operating key for said valve extending upwardly from the valve and externally of said tank, a gauge rod sliding in said key and projectable through the upper end thereof for reading, a float carried by the lower end portion of said rod, a cup positioned about the rod above said float for removing a portion of the contents of the tank when the rod, cup and float are removed through the upper end of the hollow key, and a removable closure for the open upper end of said key.

9. In combination a tank having an outlet in its bottom, a control valve for the outlet, a hollow perforated operating key for said valve extending upwardly from the valve and externally of said tank, a cap carried by said tank and rotatably receiving the projecting upper end portion of said stem, a turning head rigidly carried by the upper end of said stem above said cap and internally threaded, a gauge rod sliding in said stem for movement through said turning head and having a float carried by its lower end, a closure plug screwed into said turning head, and a cover removably carried by said cap and disposed about the turning head and projecting upper end portion of said stem and having a portion for engaging the turning head and rotating the head and stem when the cover is removed from the cap and inverted.

10. A gauge and valve operating device comprising a tubular stem having valve engaging means at its lower end and open at its upper end, a gauge rod slidable in said stem, and a float carried by the lower end portion of said rod and removable through the upper end of the stem.

11. A gauge and valve operating device comprising a tubular stem having valve engaging means at its lower end and open at its upper end, a gauge rod slidable in said stem, a float upon the lower end portion of said rod, and a cup carried by the rod above the float for withdrawing a sample of the contents of a receptacle receiving the stem when the rod, float and cup are withdrawn from the stem.

12. A gauge and valve operating device comprising a tubular stem having valve engaging means at its lower end and open at its upper end, a gauge rod slidable in said stem, and having a head at its lower end, a hollow float disposed about the lower end portion of said rod and resting upon the head at the end of the rod, a cup disposed about the rod and resting upon said float, and means for providing a tight joint between the cup and float.

13. In a structure of the character described, a cap for closing an opening in a tank dome, a hollow stem extending through said cap and rotatable therein and having an open upper end, a gauge rod sliding in said stem, and a float carried by the lower end of said rod.

14. In a structure of the character described, a cap for closing an opening in a tank dome, a hollow stem extending through said cap and rotatable therein and having an open upper end, a gauge rod sliding in said stem, a float carried by the lower end of said rod, and a cup upon the rod above said float, said rod, cup and float being bodily removable from the stem through the open upper end thereof.

15. In a structure of the character described, a cap for closing an opening in a tank dome, a hollow stem extending through said cap and rotatable therein and having an open upper end, a turning head having a threaded bore receiving a threaded upper end portion of said stem above said cap and having an internal annular seat intermediate its depth, a filler in said seat overlapping the upper edge of said stem to prevent movement of the turning head upon said stem, a closure plug screwed into said head above said stem, and a gauge rod sliding in said stem for projecting through the open upper end thereof when said plug is removed and having a float at its lower end.

16. In a structure of the character described, a cap for closing an opening in a tank dome, a hollow stem extending through said cap and rotatable therein and having an open upper end, a turning head rigid upon the upper end of said stem, closure means removably carried by said turning head, and a gauge rod sliding in said stem for projecting through the open upper end thereof when said closure means is opened and having a float at its lower end.

17. In a structure of the character described, a cap for closing an opening in a tank dome, said cap having an upwardly disposed neck provided with a downwardly disposed by-pass opening through the cap, a check valve controlling passage of air through the by-pass into a tank dome having the cap secured thereon, a hollow stem passing vertically through the cap at the neck thereof and having its upper end extending above the neck, a turning head carried by the upper end of said stem for permitting rotation of the stem, a gauge rod sliding in said stem and having a float at its lower end, a closure plug removably secured in said turning head to retain the gauge rod within the stem, and a cover removably secured upon said neck and enclosing the turning head and extended upper portion of said stem, said cover having a portion for engaging said turning head and handle means for facilitating rotation of the cover when engaged with the turning head.

18. In a tank car, a tank having an outlet in the bottom thereof, a control valve for said outlet, a key extending through the dome of the tank and into the tank for operating said control valve, a by-pass in the tank dome having a check valve therein to admit air to the tank and gauge means carried by said key and readable externally of the dome for indicating the amount of material in the tank.

19. In a tank car, a tank having an outlet in the bottom thereof, a control valve for said outlet, means comprising a key operable from above the top of said dome for controlling said control valve and gauge means carried by said key and readable externally of the tank and dome for indicating the amount of material in the tank.

In witness whereof I have hereunto set my hand.

WILLIAM K. AUCHINCLOSS.